United States Patent [19]

Küter

[11] 4,079,276
[45] Mar. 14, 1978

[54] DEVICE FOR ELECTRICALLY CONNECTING THREE-PHASE CURRENT EXCITERS TO ROTATING RECTIFIERS

[75] Inventor: Heinrich Küter, Wattenscheid, Germany

[73] Assignee: Kraftwerk Union Aktiengesellschaft, Mulheim an der Ruhr, Germany

[21] Appl. No.: 635,673

[22] Filed: Nov. 26, 1975

[30] Foreign Application Priority Data

Dec. 5, 1974 Germany .......................... 2457601

[51] Int. Cl.² .......................................... H02K 11/00
[52] U.S. Cl. ................................................. 310/68 D
[58] Field of Search ................... 310/68, 68 D, 72, 59, 310/60, 61; 318/242

[56] References Cited

U.S. PATENT DOCUMENTS

| | | | |
|---|---|---|---|
| 3,363,122 | 1/1968 | Hoover | 310/68 |
| 3,371,235 | 2/1968 | Hoover | 310/68 |
| 3,721,843 | 3/1973 | Spisak | 310/72 |
| 3,723,794 | 3/1973 | Spisak | 310/72 |
| 3,872,335 | 3/1975 | Petersen | 310/68 D |
| 3,965,379 | 6/1976 | Meusel | 310/59 |

Primary Examiner—R. Skudy

Attorney, Agent, or Firm—Herbert L. Lerner

[57] ABSTRACT

Device for electrically connecting a three-phase current exciter to rotating rectifiers includes support wheels fixed to the shaft of the exciter and insulatedly carrying the rotating rectifiers, the support wheels comprising intermediate rings formed of non-magnetic material mounted on the shaft, three-phase current connecting conductors distributed uniformly around the peripheral surface of the shaft and secured thereon against centrifugal force effects, the three-phase connecting conductors being formed of open-ended tubes, connecting conductor lengths extending through respective passageways formed in the intermediate rings in insulated relationship to the intermediate rings, the connecting conductor lengths being disposed at a greater distance diametrically from the shaft than the open-ended tubes and being of solid construction, and radial connecting members connecting the open-ended tubes to the respective connecting conductor lengths in vicinity of the support wheels, the connecting conductor lengths having portions thereof projecting laterally out of the intermediate ring passageways forward of the connection thereof to the radial connecting members whereby the projecting portions of the connecting conductor lengths act as fan blades during rotation of the exciter shaft.

4 Claims, 5 Drawing Figures

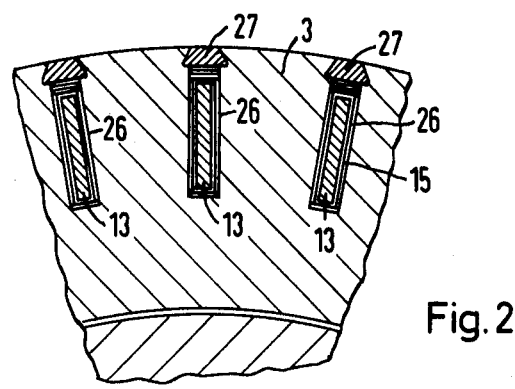
Fig. 2
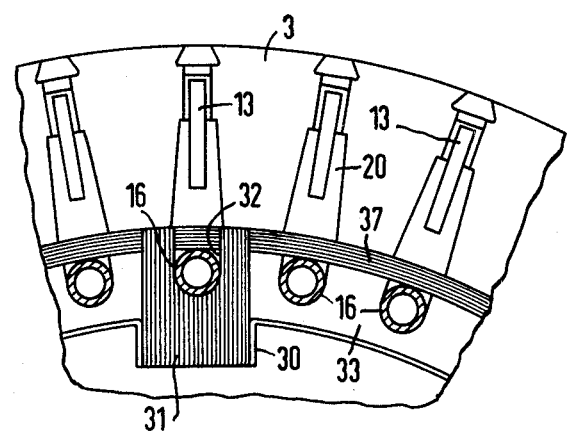
Fig. 3
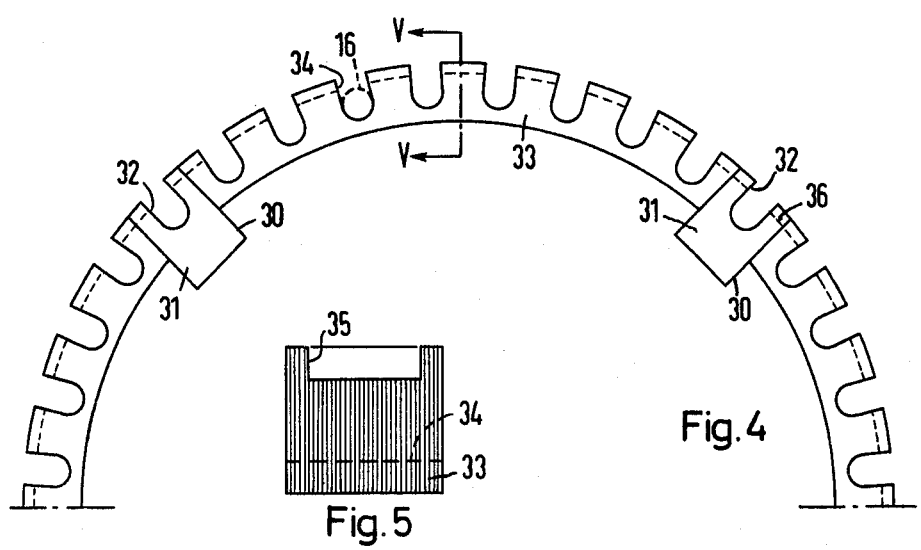
Fig. 4
Fig. 5

DEVICE FOR ELECTRICALLY CONNECTING THREE-PHASE CURRENT EXCITERS TO ROTATING RECTIFIERS

The invention relates to a device for electrically connecting three-phase current exciters to rotating rectifiers and, more particularly, to such devices wherein the rotating rectifiers are carried by support wheels insulatedly fixed to the shaft of the exciters, the electrical connection being effected by means of three-phase current connecting conductors uniformly spaced from one another on the peripheral surface of the shaft and secured thereon against centrifugal force effects.

Such devices are known, for example, from U.S. Pat. No. 3,721,843. The three-phase current connecting conductors of such devices are retained mostly on the shaft by rings or bandages of high-strength synthetic material armored or reinforced with glass fibers, the rings or bandages being superimposed on the conductor-carrying shaft. With increasing unit outputs and shaft diameters, the centrifugal force effects upon the three-phase current connecting conductors also increases, however, so that the limit of this type of fastening or securing is rapidly reached. This is even more so because more of the surface of the conductor becomes covered by ever more of the bandages or bands and the cooling action impaired thereby must be counterbalanced by layer conductor cross sections.

It is accordingly an object of the invention to provide a device of the foregoing type having three-phase current connecting conductors of such construction and disposition as to assure optimal cooling so that relatively smaller cross sections and simpler holding or retaining means are thereby made possible.

With the foregoing and other objects in view, there is provided, in accordance with the invention, a device for electrically connecting a three-phase current exciter to rotating rectifiers comprising support wheels fixed to the shaft of the exciter and insulatedly carrying the rotating rectifiers, the support wheels comprising intermediate rings formed of nonmagnetic material mounted on the shaft, three-phase current connecting conductors distributed uniformly around the peripheral surface of the shaft and secured thereon against centrifugal force effects, the three-phase connecting conductors being formed of open-ended tubes, connecting conductor lengths extending through respective passageways formed in the intermediate rings in insulated relationship to the intermediate rings, the connecting conductor lengths being disposed at a greater distance diametrically from the shaft than the open-ended tubes and being of solid construction and radial connecting members connecting the open-ended tubes to the respective connecting conductor lengths in vicinity of the support wheels, the connecting conductor lengths having portions thereof projecting laterally out of the intermediate ring passageways forward of the connection thereof to the radial connecting members whereby the projecting portions of the connecting conductor lengths act as fan blades during rotation of the exciter shaft.

Through this construction of the three-phase current connecting conductors as hollow, open tubes and a separate cooling air guidance through the support wheel passageways located at a greater diameter from the shaft, intensive inner cooling of the connecting conductors is effected, so that only a fractional part of the cross section of the heretofore known conventional solid conductors is required and also the cost of fastening or securing the same is reduced to a similar extent.

In accordance with a further feature of the invention, the connecting conductor length is constructed as a flat conductor having a substantially rectangular cross section.

In accordance with another feature of the invention, the device includes U-profile frames formed of insulating material located axially adjacent one another on the surface of the shaft and extending around the periphery of the shaft, the U-profile frames being formed with transverse notches, the tubular three-phase current connecting conductors being received in the notches, and band means formed of high-strength synthetic material wound around the connecting conductors on the U-profile frames for holding the connecting conductors thereon.

In accordance with an additional feature of the invention, the shaft is formed with axially extending and uniformly peripherally spaced longitudinal grooves in the surface thereof, longitudinal keys of synthetic material respectively received in the longitudinal grooves and formed, in turn, with respective longitudinal grooves on the radially outer side thereof, one of the tubular three-phase current connecting conductors being received, respectively, in each of the longitudinal grooves formed in the longitudinal keys, the U-profile frame being subdivided into circular segments extending in peripheral direction of the shaft between respective pairs of the longitudinal keys.

Other features which are considered as characteristic for the invention are set forth in the appended claims.

Although the invention is illustrated and described herein as device for electrically connecting three-phase current exciters to rotating rectifiers, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which:

FIG. 2 is a partial cross-sectional view of FIG. 1 taken along the line II — II in the direction of the arrows;

FIG. 3 is a partial cross-sectional view of the FIG. 1 taken along the line III — III in the direction of the arrows and showing a region of the shaft periphery in vicinity of the tubular connecting conductor;

FIG. 4 is a front elevational view of a U-profile frame disposed at the periphery of the shaft and holding the three-phase current connecting conductors; and FIG. 5 is a cross-sectional view of FIG. 4 taken along the line IV — IV in direction of the arrows.

Figure 1:
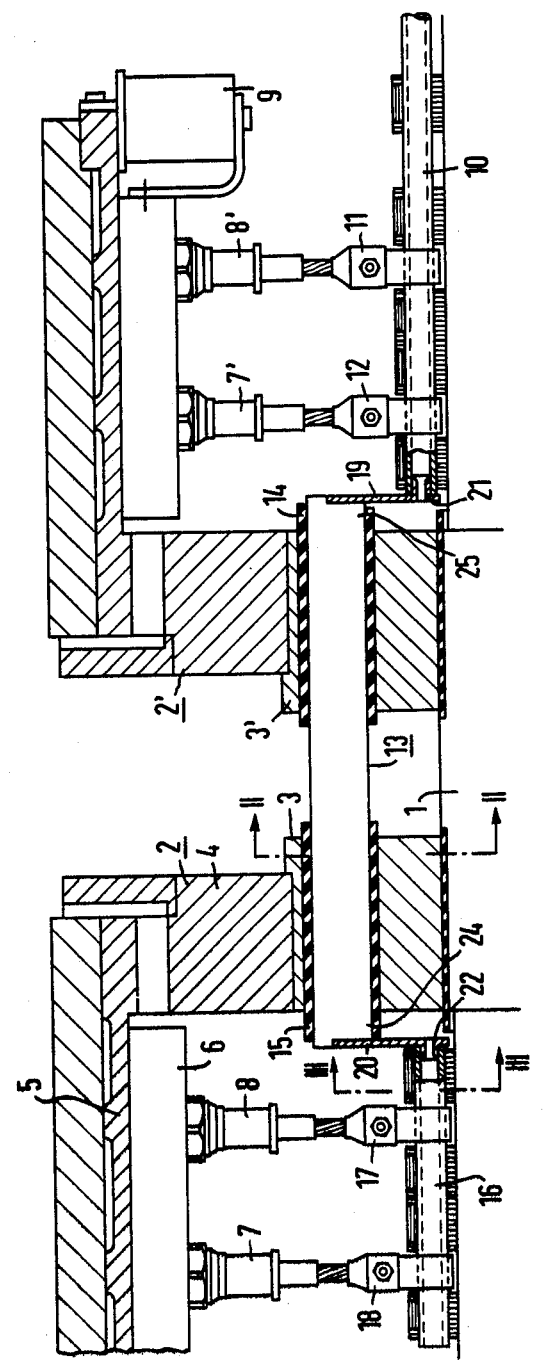
FIG. 1 is a partial longitudinal sectional view of the rotating rectifier assembly according to the invention, in a plane extending radially to the shaft of an electrical machine and through one of the three-phase current connecting conductors of the assembly.

Referring now to the drawing and first, particularly, to FIG. 1 thereof, there is shown in longitudinal cross-sectional view two rectifier support wheels 2 and 2' secured back-to-back on a shaft 1 of an electrical machine in insulated relationship to the shaft 1. The rectifier support wheels 2 and 2' are formed, respectively, of an intermediate ring 3 made of nonmagnetic material and insulatedly mounted on the shaft 1 and a hub part 4 per se of the support wheel that is press-fitted on the intermediate ring 3 with no insulation therebetween. A bipartite ring flange 5 carries heat sinks or cooling elements 6 as well as rectifier cells or diodes 7 and 8 and corresponding fuses 9, in conventional manner. The support wheels 2 and 2' act simultaneously as direct-current poles from which current is conducted through otherwise non-illustrated radial connecting bolts to direct-current conductors installed in the shaft 1.

The rectifier cells 7 and 8 which are disposed peripherally in uniform divisions or graduations are supplied with current from a non-illustrated three-phase current exciter or excitation machine through three-phase current connecting conductors disposed at the surface of the shaft 1. The entire train of one of such connecting conductors is shown in FIG. 1, partly in section. This one connecting conductor initially coming from the nonillustrated exciter is formed as a tube 10 open at both ends thereof which is held on the shaft 1 in a manner to be described hereinafter. Through respective junctions 11 and 12, both rectifier cells 7' and 8' are connected by the tubular three-phase current connecting conductor 10. Since the rectifier cells 7 and 8 of the other support wheel 2 must also be connected to the three-phase current connecting conductor, the latter is formed in the illustrated embodiment as a solid flat conductor 13 of rectangular cross secton in the vicinity of the support wheels 2 and 2' and extends at a greater diameter than the tube 10 from the shaft 1 through the intermediate rings 3 and 3', separated therefrom by insulation layers or inserts 13 and 14. It is also possible to provide a construction of round solid conductors. Behind the support wheel 2, the three-phrase current connecting conductor is again formed as a tubular conductor 16 and is connected through the junctions 17 and 18 to the rectifier cells 7 and 8. The solid connecting conductor length or portion 13 is connected through radial connecting members 19 and 20 to both of the tubular conductor lengths 10 and 16, respectively. The connecting members 19 and 20 are connected with suitable bushings or sockets 21 and 22 to the tubular connecting conductors 10 and 16 in such a way that a free outlet cross section for cooling air remains. The solid connecting conductor lengths 13 project to some extent out of the nonmagnetic intermediate rings 3 and 3' before the junction thereof with the connecting members 19 and 20, so that the thus projecting portions 24 and 25 act as fan blades and effect an intensive throughput or flow rate of cooling air through the tubular connecting conductors 10 and 16 because the latter are open also at the other end thereof.

As is apparent from the partial cross section of FIG. 2, the solid rectangular connecting conductor lengths 13 are surrounded by a respective insulating sleeve 15 and inserted in corresponding outwardly open radial grooves 26 formed in the nonmagnetic intermediate rings 3 and 3'. The grooves 26 are then closed by suitable wedges 27 and additionally secured by the shrink-fitted support wheel hub 4.

The tubular three-phase current connecting conductors 10 and 16 are retained and fixed on the surface of the shaft 1 in the following manner. As can be seen especially in FIGS. 3 and 4, four longitudinal grooves 30 are incised in the surface of the shaft 1 at uniform spacing from one another, the grooves 30 extending substantially from the radial connecting members 19 and 20 to the end of the tubular three-phase current conductors 10 and 16. Longitudinal wedges or keys 31 of synthetic material are inserted in the longitudinal grooves 30 and are formed at the radially outer sides thereof with a longitudinal groove 32 for receiving therein, respectively, one of the tubular three-phase current connecting conductors 10, 16. U-profile frames 33, subdivided into suitably long circular segments are disposed axially adjacent one another between respective pairs of the wedges or keys 31, as can be seen especially in FIG. 4. The U-profile frames 33 are also formed with suitable transversely extending notches 34 for receiving therein the three-phase current connecting conductors 10 and 16. A cross-sectional view of one of the U-profile frames 33 is shown in FIG. 5. As can be observed especially from FIG. 4, through the wedges or keys 31 and the U-profile frame 33, a sturdy receiving frame is provided on the surface of the shaft 1 for the tubular three-phase current connecting conductors 10 and 16. After inserting the conductors 10 and 16 into the corresponding recesses or notches 34 formed in the U-profile frames or in the grooves 32 of the wedges or keys 31, bandages or bands 37 of high-strength synthetic material armored with glass fibers are wound circularly in recesses 35 formed peripherally in the U-profile frame 33 which are aligned with correspondingly transversely disposed incisions 36 formed in the wedges or keys 31. Through the foregoing construction and the bandaging, there is thus produced a very sturdy and stable compound or composite of the individual tubular three-phase current connecting conductors 10, 16, whereby in spite of a great amount of overlap by corresponding bandages, an optimal cooling of the conductors 10 and 16 is assured due to the hollow construction of the latter (note FIGS. 1 and 3) and due to the formation of the connecting conductor lengths 13 extending through the nonmagnetic intermediate rings 3 and 3' as fan blades.

I claim:

1. Device for electrically connecting a three-phase current exciter to rotating rectifiers comprising support wheels fixed to the shaft of the exciter and insulatedly carrying the rotating rectifiers, said support wheels comprising respective hubs spaced from the shaft and respective intermediate rings formed of non-magnetic material mounted on the shaft radially inward of and carrying said hubs, three-phase current connecting conductors distributed uniformly around the peripheral surface of the shaft and secured thereon against centrifugal force effects, said three-phase connecting conductors being formed of open-ended tubes, connecting conductor lengths extending through respective passageways formed in said intermediate rings in insulated relationship to said intermediate rings, said connecting conductor lengths being disposed at a greater distance diametrically from the shaft than said open-ended tubes and being of solid construction, and radial connecting members connecting said open-ended tubes to the respective connecting conductor lengths in vicinity of said support wheels, said connecting conductor lengths having portions thereof projecting laterally out of said intermediate ring passageways forward of the connection thereof to said radial connecting members whereby said projecting portions of said connecting conductor lengths act as fan blades during rotation of the exciter shaft.

2. Device according to claim 1 wherein said connecting conductor length is constructed as a flat conductor having a substantially rectangular cross section.

3. Device for electrically connecting a three-phase current exciter to rotating rectifiers comprising support wheels fixed to the shaft of the exciter and insulatedly carrying the rotating rectifiers, said support wheels comprising intermediate rings formed of non-magnetic material mounted on the shaft, three-phase current connecting conductors distributed uniformly around the peripheral suface of the shaft and secured thereon against centrifugal force effects, said three-phase connecting conductors being formed of open-ended tubes, connecting conductor lengths extending through respective passageways formed in said intermediate rings in insulated relationship to said intermediate rings, said connecting conductor lengths being disposed at a greater distance diametrically from the shaft than said open-ended tubes and being of solid construction, radial connecting members connecting said open-ended tubes to the respective connecting conductor lengths in vicinity of said support wheels, said connecting conductor lengths having portions thereof projecting laterally out of said intermediate ring passageways forward of the connection thereof to said radial connecting members whereby said projecting portions of said connecting conductor lengths act as fan blades during rotation of the exciter shaft, and U-profile frames formed of insulating material located axially adjacent one another on the surface of the shaft and extending around the periphery of the shaft, said U-profile frames being formed with transverse notches, said tubular three-phase current connecting conductors being received in said notches, and band means formed of high-strength synthetic material wound around said connecting conductors on said U-profile frames for holding said connecting conductors thereon.

4. Device for electrically connecting a three-phase current exciter to rotating rectifiers comprising support wheels fixed to the shaft of the exciter and insulatedly carrying the rotating rectifiers, said support wheels comprising intermediate rings formed of non-magnetic material mounted on the shaft, three-phase current connecting conductors distributed uniformly around the peripheral surface of the shaft and secured thereon against centrifugal force effects, said three-phase connecting conductors being formed of open-ended tubes, connecting conductor lengths extending through respective passageways formed in said intermediate rings in insulated relationship to said intermediate rings, said connecting conductor lengths being disposed at a greater distance diametrically from the shaft than said open-ended tubes and being of solid construction, radial connecting members connecting said open-ended tubes to the respective connecting conductor lengths in vicinity of said support wheels, said connecting conductor lengths having portions thereof projecting laterally out of said intermediate ring passageways forward of the connection thereof to said radial connecting members whereby said projecting portions of said connecting conductor lengths act as fan blades during rotation of the exciter shaft, the shaft being formed with axially extending and uniformly peripherally spaced longitudinal grooves in the surface thereof, longitudinal keys of synthetic material respectively received in said longitudinal grooves and formed, in turn, with respective longitudinal grooves on the radially outer side thereof, one of said tubular three-phase current connecting conductors being received, respectively, in each of said longitudinal grooves fromed in said longitudinal keys, and U-profile frames subdivided into circular segments extending in peripheral direction of the shaft between respective pairs of said longitudinal keys.

* * * * *